United States Patent [19]

Keenan et al.

[11] Patent Number: 5,263,801
[45] Date of Patent: Nov. 23, 1993

[54] DUAL BLADDER AIRBAG

[75] Inventors: Thomas C. Keenan, Brentwood; Douglas A. Goshorn, Franklin, both of Tenn.

[73] Assignee: Illinois Tool Works Inc., Glenview, Ill.

[21] Appl. No.: 983,045

[22] Filed: Nov. 30, 1992

[51] Int. Cl.$^5$ .................................................. B60P 7/14
[52] U.S. Cl. .................................. 410/119; 410/125; 206/522
[58] Field of Search .............. 410/117, 118, 119, 121, 410/122, 123, 124, 125; 206/522; 383/25

[56] References Cited

U.S. PATENT DOCUMENTS

| | | | |
|---|---|---|---|
| 2,697,229 | 12/1954 | Krueger | 206/522 X |
| 3,554,135 | 1/1971 | Duvall et al. | 410/119 |
| 3,929,227 | 12/1975 | Burdis | 206/522 X |
| 3,955,690 | 5/1976 | Baxter | 410/118 |
| 3,960,281 | 6/1976 | Reeves | 410/119 |
| 4,136,788 | 1/1979 | Robbins | 410/119 |
| 4,184,596 | 1/1980 | Avery | 206/522 |
| 4,465,188 | 8/1984 | Soroka et al. | 206/522 |
| 4,553,887 | 11/1985 | Reeves | 410/119 |
| 4,572,716 | 2/1986 | West | 410/119 X |
| 4,591,519 | 5/1986 | Liebel | 410/119 X |
| 5,042,663 | 8/1991 | Heinrich | 410/119 X |

FOREIGN PATENT DOCUMENTS

| | | | |
|---|---|---|---|
| 2291114 | 6/1976 | France | 206/522 |
| 1052586 | 12/1966 | United Kingdom | 410/119 |

Primary Examiner—Michael S. Huppert
Assistant Examiner—James T. Eller, Jr.
Attorney, Agent, or Firm—Schwartz & Weinrieb

[57] ABSTRACT

An airbag for use in a cargo bay of a transport vehicle for buffering and stabilizing a load, usually large paper rolls or drums, is provided with two inflatable, gas-tight bladders surrounded by a multi-ply paper container. The bladders are situated in an overlapping relationship with respect to each other. This enables the load to be buffered and stabilized while minimizing the need for additional materials.

20 Claims, 1 Drawing Sheet

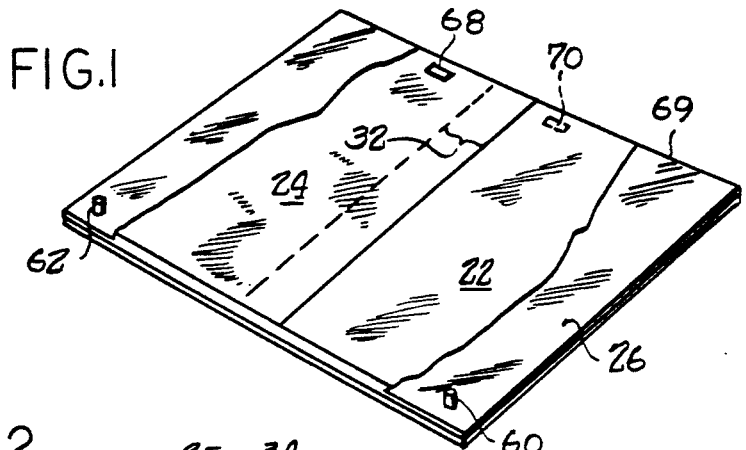
FIG.1
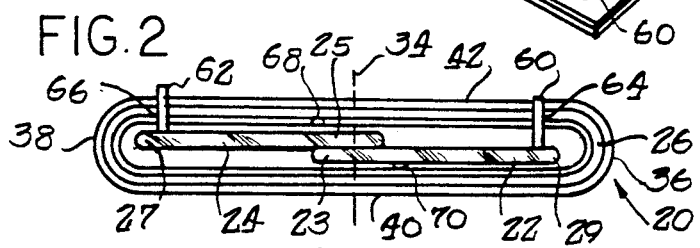
FIG.2
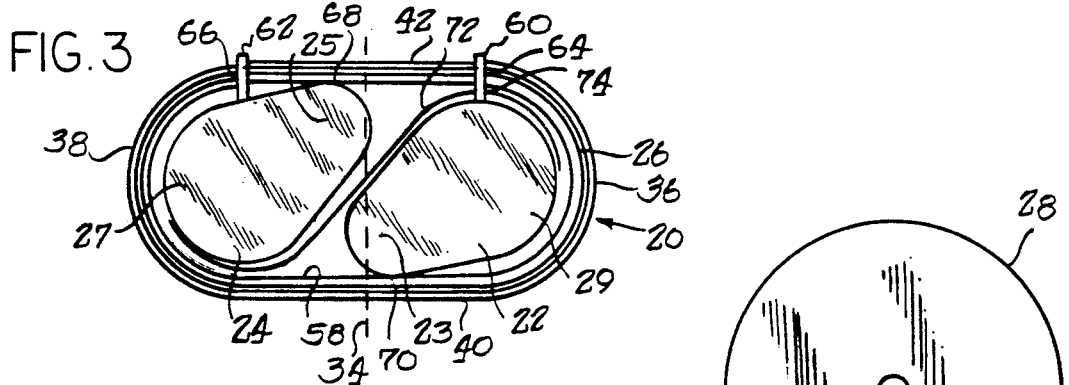
FIG.3
FIG.4
FIG.5 PRIOR ART
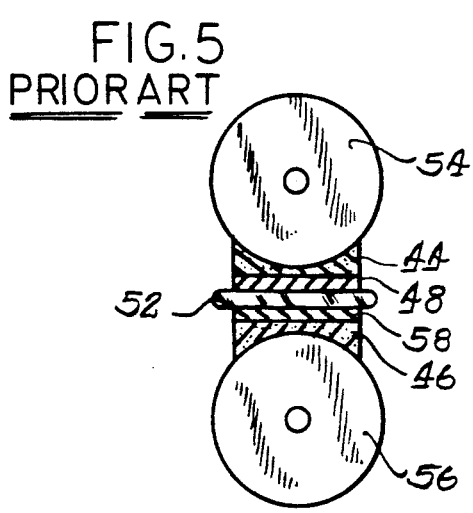
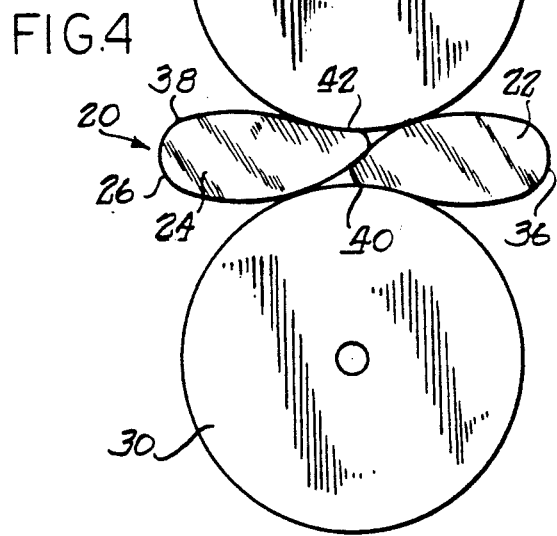

DUAL BLADDER AIRBAG

FIELD OF THE INVENTION

The present invention is directed to cargo airbags that are placed between loads, such as large paper rolls or drums and the like, in a transport vehicle, such as a train, ship, truck, aircraft and the like, in order to brace the load from shifting or damaging itself during transport because of voids between the loads and, more particularly to an improved airbag that minimizes the need for additional buffer material.

BACKGROUND OF THE INVENTION

It is well-known in the art to use inflatable airbags for bracing a load, such as large paper rolls. These airbags typically consist of a single plastic inflatable bladder surrounded by some form of container, usually a multi-ply paper container. The container prevents the bladder from being punctured by the load or other objects in the cargo bay. The airbag includes an air inlet valve so that the bladder can be inflated.

In order to brace a load using this type of airbag, special contour roll buffers or chocks, as shown in FIG. 5, are needed to hold the airbag between the rolls or between a roll and the wall. The contour roll buffers or chocks complement the shape of the rolls and hold the rolls. Also, additional dunnage is often needed to pad the contact point between the airbag and the contour roll buffers. If the contour roll buffers and additional dunnage are not used, the airbag has a tendency to slip out from between the rolls.

When using this type of single bladder airbag, the airbag is placed between the contour roll buffers and additional dunnage in a deflated condition and then inflated through the valve with high pressure air to the desired air pressure, usually 2 to 8 pounds per square inch, depending upon the size of the bladder and the container structure. In the inflated condition, the voids between the rolls are filled and the rolls are stabilized and ready for transport.

Since the design of this airbag necessitates the use of contour roller buffers and additional dunnage, this single bladder airbag presents a serious disadvantage. These items add extra weight to the load and increase the total expense. They also take up additional valuable space that could be used for more rolls or drums during a shipment.

The present invention presents a novel airbag that is intended to minimize these problems, as well as to present several other improvements.

OBJECTS OF THE INVENTION

A general object of the present invention is to provide a novel airbag for use as a brace between loads in a transport vehicle.

Another object of the present invention is to provide an airbag that minimizes the amount of buffer material needed to support a load.

It is a specific object of the present invention to provide a dual bladder airbag that can buffer and stabilize a load.

SUMMARY OF THE INVENTION

Briefly, and in accordance with the foregoing, the present invention comprises an airbag for use in a cargo bay of a transport vehicle for buffering and stabilizing a load, usually large paper rolls or drums. Specifically, the airbag is comprised of two inflatable, gas-tight bladders surrounded by a multi-ply paper container. The bladders are situated in an overlapping relationship with respect to each other. This enables the load to be buffered and stabilized while minimizing the need for additional materials.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements and in which:

FIG. 1 is a simplified perspective view of the present invention having an overwrap or outer container partially broken away in order to show two deflated bladders contained therein;

FIG. 2 is a simplified partial cross sectional view of the deflated airbag of the present invention showing the overlapping bladders within a container formed from paper or other suitable sheet material;

FIG. 3 is a simplified partial cross sectional view similar to FIG. 2, but showing the airbag of the present invention in an inflated condition;

FIG. 4 is a simplified cross sectional view of an inflated airbag of the present invention between a load; and FIG. 5 is a simplified cross sectional view of an inflated PRIOR ART airbag between a load.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As illustrated in the Figures, the present invention is directed to an airbag 20 generally comprised of two bladders 22 and 24 and a container 26 in a novel arrangement. As illustrated in FIG. 4, the airbag 20 of the present invention is particularly suited for use to hold and stabilize various large objects having cylindrical or other curved or irregular surfaces, such as large paper rolls or drums 28 and 30 during transport by filling a void left between the rolls 28 and 30 when they are placed side-by-side.

Each bladder 22 and 24 may be a seamless tube of polyethylene, rubber or the like and of typical construction. The bladders 22 and 24 are sealed so as to be gas-tight. The bladder size may vary depending on the size of the load 28 and 30 that the airbag 20 is supporting, but bladders 22 and 24 are preferably of equal size.

As shown in FIG. 1, the bladders 22 and 24 lie in an overlapping relationship. As shown in FIGS. 2 and 3, this overlap 32 occurs along the center 34 of the airbag 20. The overlap 32 may vary depending on the size of the load 28 and 30 to be supported. For example, if 4 to 6 mil polyethylene bladders are used, the bladders should overlap each other a distance of approximately 2 to 4 inches in the deflated condition. Thus, when the airbag 20 is placed between two rolls 28 and 30 or a roll and a wall (not shown) and then inflated, the bladders 22 and 24 will overlap each other. This overlap 32 distributes the load of the roll or rolls 28 and 30 and prevents the bladders 22 and 24 from being completely collapsed and pinched together at their overlapping ends 23 and 25.

As shown in FIG. 4, the shape of the airbag 20 will contour to the shape of the rolls 28 and 30 when inflated. The transverse dimension of the container or relatively non-elastic bag 26 is less than twice the corresponding dimension of each bladder 22 and 24 so that the bladders 22 and 24 will be retained in their overlapping relation when inflated as shown in FIGS. 3 and 4. When the airbag 20 is inflated, overlapping portions 23 and 25 of the bladders 22 and 24 at the center 34 of the airbag 20 are thinner than the outer marginal portions 27 and 29 of the bladders adjacent the ends 36 and 38 of the airbag 20. When the airbag 20 is inflated and confined between objects of cargo such as the rolls 28 and 30 shown in FIG. 4, a portion of the sides 40 and 42 of the airbag 20 take on a concave shape that conforms to the shape of the rolls 28 and 30. Thus, the shape of the inflated airbag 20 will prevent the airbag 20 from slipping out from between the rolls 28 and 30 or a roll and a wall. This eliminates the need for the special contour roll buffers 44 and 46 and additional dunnage 48 and 50 that is needed when a prior art single bladder airbag 52, as shown in FIG. 5, is used for stabilizing two rolls or drums 54 and 56. Thus, the extra weight and material of these items is eliminated. Furthermore, since only the dual bladder airbag 20 is needed to buffer and fill the void between the rolls 28 and 30, less space is wasted and more rolls can be transported during a single shipment.

The bladders 22 and 24 are enclosed in a container 26 of known construction such as the multi-ply dunnage bag disclosed in U.S. Pat. No. 4,136,788 whose disclosure is incorporated herein by reference. The container 26 is comprised of multiple layers of suitable sheet material such as paper, usually 4 to 8 plies, and completely encloses the bladders 22 and 24 within. The size of the container 26 may vary and depends on the size of the bladders 22 and 24 being used. The container 26 prevents the bladders 22 and 24 from being punctured by the load 28 and 30 or by other objects which may be found in a cargo bay.

In the preferred embodiment shown in the Figures, each of the bladders 22 and 24 includes a valve 60 and 62 for inflating the respective bladder 22 and 24. It is to be understood, however, that it is contemplated in the design that a single valve could be used to inflate both bladders. The valves 60 and 62 are located adjacent one margin 61 of the container 26 and extend through holes 64 and 66, respectively, in the container 26 so as to allow the bladders 22 and 24 to be inflated. The bladders 22 and 24 are inflated by high pressure air from an appropriate source to a desired air pressure, usually 2 to 8 pounds per square inch, depending on the size and the container structure of the airbag.

The bladders 22 and 24 are attached to the container 26 by way of the valves 60 and 62 and a patch or tab of adhesive 68 and 70. The adhesive patches 68 and 70 are preferably constructed of a pressure sensitive or hot melt adhesive. The adhesive patches 68 and 70 are located adjacent to margin 69. Margin 69 is opposite to the margin 61. The adhesive patches 68 and 70 must be near the margin 69 in order to allow the bladders 22 and 24 to move relative to the container 26 during inflation and to fully inflate. When the airbag 20 is oriented in a vertical position with the margin 69 being positioned higher or above the margin 61, the adhesive patches 68 and 70 will prevent the bladders 22 and 24 from sagging, sliding or otherwise falling within the container 26 when the bladders 22 and 24 are in the deflated condition. This will prevent incomplete inflation of one or both of the bladders 22 and 24 which would result in pinching of the bladders 22 and 24 and/or non-uniform inflation and support. When the bladders 22 and 24 are inflated, the adhesive patches 68 and 70 will release and the bladders 22 and 24 will not be attached to the container 26.

As shown in FIG. 3, the bladders 22 and 24 are in an inflated configuration while being in a relatively non-contacting relationship with the inside wall 58 of the container 26. This is only for purposes of illustration to show clarity. It is to be understood that when the bladders 22 and 24 are inflated, the majority of the bladders 22 and 24 will contact the inside wall 58 of the container 26.

A slip sheet 72, as shown in FIG. 3, may be included in the design of the airbag 20. The slip sheet 72 is placed between the two bladders 22 and 24 and is used to minimize the amount of friction between the bladders 22 and 24. Without a slip sheet 72, the bladders 22 and 24 may rub against each other. The slip sheet 72 is not attached to the bladders 22 and 24 or the container 26, as shown in FIG. 3, and thus is free floating in the airbag 20. The slip sheet 72 is generally comprised of multiple layers of paper, usually 1 to 3 plies. The size of the slip sheet 72 may vary depending on the size of the bladders 22 and 24. A hole or aperture 74 may be included in the design of the slip sheet 72 to allow a valve 60 to pass therethrough if needed.

When the airbag 20 is manufactured, the bladders 22 and 24 are flat, as shown in FIG. 2. The bladders 22 and 24 are placed in the desired overlapping relationship and the slip sheet 72, if being used, is placed between the bladders 22 and 24. Adhesive patches 68 and 70 are placed on the bladders 22 and 24. The bladders 22 and 24 and the slip sheet 72, if used, are then completely enclosed in the container 26 by known methods. The adhesive patches 68 and 70 bond with the container 26. The valves 60 and 62 protrude from the airbag 20.

When the airbag 20 is being used to buffer and stabilize a load 28 and 30, it is placed in the void between the rolls or drums 28 and 30 in a deflated condition. A worker then inflates the bladders 22 and 24 by injecting high pressure air from an appropriate source through the valves 60 and 62 to the desired pressure. In order to do this, one bladder 22 may first be inflated and then the second bladder 24 will be inflated or, both bladders 22 and 24 may be inflated at the same time. When the airbag 20 is inflated, the adhesive patches 68 and 70 will release from the container 26. The airbag 20 conforms to the shape of the rolls 28 and 30, as shown in FIG. 4 and as described hereinabove, and buffers and stabilizes the load 28 and 30. After use, the airbag 20 may be disposed of, or deflated by appropriate means for reuse.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:
1. A cargo airbag, comprising:
an expandable container comprising wall structure defining a single sealed enclosure;

a plurality of separate and independent inflatable bladders disposed within said single sealed enclosure; and means fluidically connected to each one of said plurality of separate and independent inflatable bladders and projecting outwardly through said wall structure of said expandable container for permitting inflation of said plurality of separate and independent inflatable bladders.

2. A cargo airbag as set forth in claim 1, wherein:
said bladders overlap each other a predetermined distance.

3. A cargo airbag as defined in claim 2 wherein said bladders overlap each other a distance less than the width of one of said bladders.

4. A cargo airbag as defined in claim 2 wherein said bladders overlap each other a distance less than one third of the width of one of said bladders.

5. A cargo airbag as defined in claim 2 wherein said bladders overlap each other about two to four inches.

6. A cargo airbag as set forth in claim 2, wherein:
said expandable container has a predetermined width dimension as defined along a width direction of said container; and
said bladders overlap each other a predetermined distance in said width direction.

7. A cargo airbag as set forth in claim 6, wherein:
said bladders overlap each other a predetermined distance in said width direction when said bladders are disposed in both of inflated and deflated states.

8. A cargo airbag as set forth in claim 6, wherein:
said bladders overlap each other within the vicinity of the center of said expandable container as viewed in said width direction.

9. A cargo airbag as defined in claim 1, wherein:
said means fluidically connected to each one of said bladders comprises an air inlet valve; and
said expandable container has a means defining an opening for allowing said valve to pass therethrough.

10. A cargo airbag as defined in claim 1 further including a slip sheet being disposed between the bladders.

11. A cargo airbag as set forth in claim 10, wherein:
said slip sheet is free-floating within said sealed enclosure so as not to be attached to either one of said bladders or said expandable container.

12. A cargo airbag as set forth in claim 10, wherein:
said slip sheet comprises a plurality of plies of paper.

13. A cargo airbag as defined in claim 1 further including a means for preventing the bladders from sliding within the expandable container when the airbag is placed in a vertical position.

14. A cargo airbag as defined in claim 13 wherein the means for preventing the bladders from sliding is an adhesive material.

15. A cargo airbag as set forth in claim 1, wherein:
said expandable container comprises a plurality of plies of paper.

16. A cargo airbag as set forth in claim 1, wherein:
each one of said bladders is fabricated from polyethylene.

17. A cargo airbag as set forth in claim 1, wherein:
each one of said bladders is fabricated from rubber.

18. A cargo airbag for placement between loads within a cargo bay, comprising:
two separate and independent inflatable bladders;
said separate and independent bladders overlapping each other a distance which is less than one third of the width of one of said bladders;
each one of said separate and independent bladders having gas inlet means for permitting inflation of said bladders;
an expandable container comprising a sealed wall structure for enclosing said separate and independent bladders; and
said expandable container including means defining an opening for allowing said gas inlet means to pass through said sealed wall structure.

19. A cargo airbag as defined in claim 18 wherein said expandable container comprises a plurality of plies of paper.

20. A cargo airbag as set forth in claim 9, wherein:
said bladders overlap each other when said bladders are disposed in both inflated and deflated states.

* * * * *